(12) United States Patent
Everingham et al.

(10) Patent No.: US 8,635,519 B2
(45) Date of Patent: *Jan. 21, 2014

(54) SYSTEM AND METHOD FOR SHARING CONTENT BASED ON POSITIONAL TAGGING

(75) Inventors: James R. Everingham, Santa Cruz, CA (US); Will H. Scullin, Mountain View, CA (US)

(73) Assignee: Luminate, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,460

(22) Filed: Aug. 26, 2011

(65) Prior Publication Data
US 2013/0055104 A1    Feb. 28, 2013

(51) Int. Cl.
*G06F 17/00* (2006.01)
*G06F 17/30* (2006.01)

(52) U.S. Cl.
USPC ........... 715/205; 715/234; 715/255; 715/760; 709/217; 709/229; 707/627; 707/769

(58) Field of Classification Search
USPC ......... 715/200–206, 209, 210, 226, 227, 231, 715/234, 255, 256, 700, 731, 760, 763, 715/861; 709/201–204, 212, 214, 217–221, 709/223, 228, 229, 230; 707/602, 609, 621, 707/627, 661, 705, 769
See application file for complete search history.

(56) References Cited

U.S. PATENT DOCUMENTS

| | | |
|---|---|---|
| D297,243 S | 8/1988 | Wells-Papanek et al. |
| 4,789,962 A | 12/1988 | Berry et al. |
| 5,008,853 A | 4/1991 | Bly et al. |
| 5,199,104 A | 3/1993 | Hirayama |
| 5,287,448 A | 2/1994 | Nicol et al. |
| 5,349,518 A | 9/1994 | Zifferer et al. |
| 5,367,623 A | 11/1994 | Iwai et al. |
| 5,428,733 A | 6/1995 | Carr |
| 5,583,655 A | 12/1996 | Tsukamoto et al. |
| 5,589,892 A | 12/1996 | Knee et al. |
| 5,615,367 A | 3/1997 | Bennett et al. |
| 5,627,958 A | 5/1997 | Potts et al. |

(Continued)

OTHER PUBLICATIONS

Cascia et al., "Combining Textual and Visual Cues for Content-based Image Retrieval on the World Wide Web," IEEE Workshop on Content-based Access of Image and Video Libraries (Jun. 1998).

(Continued)

*Primary Examiner* — Maikhanh Nguyen
(74) *Attorney, Agent, or Firm* — Michael B. Rubin; Bozicevic, Field & Francis LLP

(57) ABSTRACT

Systems and methods for sharing digital content based on positional tagging on a digital platform. For example, in one embodiment, the systems and methods generally include: (a) providing a first user with an interface to tag content on a first digital platform; (b) creating a positional identifier that identifies the location of the tagged content on the first digital platform; and (c) posting, on a second digital platform, a link to the first digital platform. When a second user on the second digital platform activates the link on the second digital platform, the second user is directed to the first digital platform. The systems and methods thereafter include: (d) identifying when a second user has accessed the first digital platform via the link on the second digital platform; and (e) highlighting the tagged content on the first digital platform.

18 Claims, 4 Drawing Sheets

(56) References Cited

U.S. PATENT DOCUMENTS

| | | |
|---|---|---|
| D384,050 S | 9/1997 | Kodosky |
| D384,052 S | 9/1997 | Kodosky |
| 5,682,469 A | 10/1997 | Linnett et al. |
| 5,684,716 A | 11/1997 | Freeman |
| 5,689,669 A | 11/1997 | Lynch et al. |
| 5,706,507 A | 1/1998 | Schloss |
| 5,721,906 A | 2/1998 | Siefert |
| 5,724,484 A | 3/1998 | Kagami et al. |
| 5,754,176 A | 5/1998 | Crawford |
| 5,796,932 A | 8/1998 | Fox et al. |
| D406,828 S | 3/1999 | Newton et al. |
| 5,933,138 A | 8/1999 | Driskell |
| 5,956,029 A | 9/1999 | Okada et al. |
| 6,026,377 A | 2/2000 | Burke |
| 6,034,687 A | 3/2000 | Taylor et al. |
| D427,576 S | 7/2000 | Coleman |
| 6,285,381 B1 | 9/2001 | Sawano et al. |
| D450,059 S | 11/2001 | Itou |
| 6,356,908 B1 | 3/2002 | Brown et al. |
| 6,414,679 B1 | 7/2002 | Miodonski et al. |
| D469,104 S | 1/2003 | Istvan et al. |
| 6,513,035 B1 | 1/2003 | Tanaka et al. |
| 6,728,752 B1 | 4/2004 | Chen et al. |
| 7,069,308 B2 * | 6/2006 | Abrams .................... 709/204 |
| D528,552 S | 9/2006 | Nevill-Manning |
| D531,185 S | 10/2006 | Cummins |
| 7,117,254 B2 | 10/2006 | Lunt et al. |
| 7,124,372 B2 | 10/2006 | Brin |
| 7,159,185 B1 | 1/2007 | Vedula et al. |
| 7,231,395 B2 | 6/2007 | Fain et al. |
| 7,233,316 B2 | 6/2007 | Smith et al. |
| 7,251,637 B1 | 7/2007 | Caid et al. |
| D553,632 S | 10/2007 | Harvey et al. |
| D555,661 S | 11/2007 | Kim |
| D557,275 S | 12/2007 | De Mar et al. |
| D562,840 S | 2/2008 | Cameron |
| D566,716 S | 4/2008 | Rasmussen et al. |
| D567,252 S | 4/2008 | Choe et al. |
| 7,383,510 B2 | 6/2008 | Pry |
| D577,365 S | 9/2008 | Flynt et al. |
| 7,428,504 B2 | 9/2008 | Song |
| 7,437,358 B2 | 10/2008 | Arrouye et al. |
| 7,502,785 B2 | 3/2009 | Chen et al. |
| D590,412 S | 4/2009 | Saft et al. |
| 7,519,200 B2 | 4/2009 | Gokturk et al. |
| 7,519,595 B2 | 4/2009 | Solaro et al. |
| 7,558,781 B2 | 7/2009 | Probst et al. |
| D600,704 S | 9/2009 | LaManna et al. |
| D600,706 S | 9/2009 | LaManna et al. |
| 7,599,938 B1 | 10/2009 | Harrison, Jr. |
| 7,657,100 B2 | 2/2010 | Gokturk et al. |
| 7,657,126 B2 | 2/2010 | Gokturk et al. |
| 7,660,468 B2 | 2/2010 | Gokturk et al. |
| D613,299 S | 4/2010 | Owen et al. |
| D613,750 S | 4/2010 | Truelove et al. |
| D614,638 S | 4/2010 | Viegers et al. |
| 7,760,917 B2 | 7/2010 | Vanhoucke et al. |
| 7,774,333 B2 | 8/2010 | Colledge et al. |
| 7,783,135 B2 | 8/2010 | Gokturk et al. |
| 7,792,818 B2 | 9/2010 | Fain et al. |
| D626,133 S | 10/2010 | Murphy et al. |
| 7,809,722 B2 | 10/2010 | Gokturk et al. |
| D629,411 S | 12/2010 | Weir et al. |
| D638,025 S | 5/2011 | Saft et al. |
| 7,945,653 B2 | 5/2011 | Zuckerberg et al. |
| D643,044 S | 8/2011 | Ording |
| 8,024,345 B2 | 9/2011 | Colledge et al. |
| 8,027,940 B2 | 9/2011 | Li et al. |
| 8,036,990 B1 | 10/2011 | Mir et al. |
| 8,055,688 B2 | 11/2011 | Giblin |
| 8,060,161 B2 | 11/2011 | Kwak |
| 8,065,184 B2 | 11/2011 | Wright et al. |
| D652,424 S | 1/2012 | Cahill et al. |
| 8,136,028 B1 | 3/2012 | Loeb et al. |
| 8,166,383 B1 | 4/2012 | Everingham et al. |
| 8,175,922 B2 | 5/2012 | Jones et al. |
| 8,234,168 B1 | 7/2012 | Lagle Ruiz et al. |
| D664,976 S | 8/2012 | Everingham |
| D664,977 S | 8/2012 | Everingham |
| 8,250,145 B2 * | 8/2012 | Zuckerberg et al. .......... 709/204 |
| 8,255,495 B1 | 8/2012 | Lee |
| 8,280,959 B1 * | 10/2012 | Zuckerberg et al. .......... 709/204 |
| 8,311,889 B1 | 11/2012 | Lagle Ruiz et al. |
| 8,392,538 B1 | 3/2013 | Lee |
| 2002/0065844 A1 | 5/2002 | Robinson et al. |
| 2003/0050863 A1 | 3/2003 | Radwin |
| 2003/0131357 A1 | 7/2003 | Kim |
| 2003/0220912 A1 | 11/2003 | Fain et al. |
| 2004/0070616 A1 | 4/2004 | Hildebrandt et al. |
| 2005/0216300 A1 * | 9/2005 | Appelman et al. ................. 705/1 |
| 2005/0235062 A1 | 10/2005 | Lunt et al. |
| 2005/0251760 A1 | 11/2005 | Sato et al. |
| 2006/0155684 A1 | 7/2006 | Liu et al. |
| 2006/0179453 A1 | 8/2006 | Kadie et al. |
| 2006/0265400 A1 | 11/2006 | Fain et al. |
| 2007/0032244 A1 * | 2/2007 | Counts et al. .............. 455/456.1 |
| 2007/0118520 A1 | 5/2007 | Bliss et al. |
| 2007/0157119 A1 | 7/2007 | Bishop |
| 2007/0203903 A1 | 8/2007 | Attaran Rezaei et al. |
| 2007/0219968 A1 | 9/2007 | Frank |
| 2007/0255785 A1 | 11/2007 | Hayashi et al. |
| 2007/0258646 A1 | 11/2007 | Sung et al. |
| 2008/0016040 A1 | 1/2008 | Jones et al. |
| 2008/0046458 A1 * | 2/2008 | Tseng et al. .................. 707/102 |
| 2008/0079696 A1 | 4/2008 | Shim et al. |
| 2008/0082426 A1 | 4/2008 | Gokturk et al. |
| 2008/0091723 A1 | 4/2008 | Zuckerberg et al. |
| 2008/0134088 A1 | 6/2008 | Tse et al. |
| 2008/0141110 A1 | 6/2008 | Gura |
| 2008/0163379 A1 | 7/2008 | Robinson et al. |
| 2008/0177640 A1 | 7/2008 | Gokturk et al. |
| 2008/0199075 A1 | 8/2008 | Gokturk et al. |
| 2008/0208849 A1 | 8/2008 | Conwell |
| 2008/0268876 A1 | 10/2008 | Gelfand et al. |
| 2008/0306933 A1 | 12/2008 | Valliani et al. |
| 2009/0006375 A1 | 1/2009 | Lax et al. |
| 2009/0007012 A1 | 1/2009 | Mandic et al. |
| 2009/0064003 A1 | 3/2009 | Harris et al. |
| 2009/0070435 A1 * | 3/2009 | Abhyanker ................... 709/218 |
| 2009/0113475 A1 | 4/2009 | Li |
| 2009/0125544 A1 | 5/2009 | Brindley |
| 2009/0144392 A1 | 6/2009 | Wang et al. |
| 2009/0148045 A1 | 6/2009 | Lee et al. |
| 2009/0158146 A1 | 6/2009 | Curtis et al. |
| 2009/0159342 A1 | 6/2009 | Markiewicz et al. |
| 2009/0165140 A1 | 6/2009 | Robinson et al. |
| 2009/0171964 A1 * | 7/2009 | Eberstadt et al. .................. 707/9 |
| 2009/0193032 A1 | 7/2009 | Pyper |
| 2009/0228838 A1 | 9/2009 | Ryan et al. |
| 2009/0287669 A1 | 11/2009 | Bennett |
| 2010/0005001 A1 | 1/2010 | Aizen et al. |
| 2010/0005087 A1 | 1/2010 | Basco et al. |
| 2010/0046842 A1 | 2/2010 | Conwell |
| 2010/0054600 A1 | 3/2010 | Anbalagan et al. |
| 2010/0054601 A1 * | 3/2010 | Anbalagan et al. .......... 382/180 |
| 2010/0063961 A1 * | 3/2010 | Guiheneuf et al. .......... 707/622 |
| 2010/0077290 A1 | 3/2010 | Pueyo |
| 2010/0161631 A1 * | 6/2010 | Yu et al. ....................... 707/758 |
| 2010/0191586 A1 | 7/2010 | Veeramachaneni et al. |
| 2010/0260426 A1 | 10/2010 | Huang et al. |
| 2010/0287236 A1 | 11/2010 | Amento et al. |
| 2010/0290699 A1 | 11/2010 | Adam et al. |
| 2010/0312596 A1 | 12/2010 | Saffari et al. |
| 2010/0313143 A1 | 12/2010 | Jung et al. |
| 2011/0010676 A1 | 1/2011 | Khosravy et al. |
| 2011/0022958 A1 | 1/2011 | Kang et al. |
| 2011/0072047 A1 | 3/2011 | Wang et al. |
| 2011/0082825 A1 | 4/2011 | Sathish et al. |
| 2011/0087990 A1 | 4/2011 | Ng et al. |
| 2011/0131537 A1 | 6/2011 | Cho et al. |
| 2011/0138300 A1 | 6/2011 | Kim et al. |
| 2011/0164058 A1 | 7/2011 | Lemay |
| 2011/0173190 A1 | 7/2011 | Van Zwol et al. |
| 2011/0184814 A1 | 7/2011 | Konkol et al. |

(56) References Cited

U.S. PATENT DOCUMENTS

| | | |
|---|---|---|
| 2011/0196863 A1 | 8/2011 | Marcucci et al. |
| 2011/0243459 A1 | 10/2011 | Deng |
| 2011/0264736 A1* | 10/2011 | Zuckerberg et al. .......... 709/204 |
| 2011/0276396 A1 | 11/2011 | Rathod |
| 2011/0280447 A1 | 11/2011 | Conwell |
| 2011/0288935 A1 | 11/2011 | Elvekrog et al. |
| 2011/0296339 A1 | 12/2011 | Kang |
| 2012/0005209 A1 | 1/2012 | Rinearson et al. |
| 2012/0036132 A1 | 2/2012 | Doyle |
| 2012/0054355 A1 | 3/2012 | Arrasvuori et al. |
| 2012/0059884 A1* | 3/2012 | Rothschild .................. 709/206 |
| 2012/0075433 A1 | 3/2012 | Tatzgern et al. |
| 2012/0110464 A1* | 5/2012 | Chen et al. .................. 715/738 |
| 2012/0158668 A1 | 6/2012 | Tu et al. |
| 2012/0185343 A1 | 7/2012 | Jones et al. |
| 2012/0203651 A1 | 8/2012 | Leggatt |
| 2012/0205436 A1 | 8/2012 | Thomas et al. |
| 2012/0231425 A1 | 9/2012 | Calman et al. |
| 2012/0233000 A1 | 9/2012 | Fisher et al. |
| 2012/0233143 A1 | 9/2012 | Everingham |
| 2012/0258776 A1 | 10/2012 | Lord et al. |
| 2012/0287469 A1 | 11/2012 | Tomiyasu et al. |
| 2012/0290387 A1 | 11/2012 | Davis |
| 2013/0063561 A1 | 3/2013 | Stephan |

OTHER PUBLICATIONS

Everingham et al., "'Hello! My name is . . . Buffy'—Automatic Naming of Characters in TV Video," Proceedings of the 17th British Machine Vision Conference (BMVC2006), pp. 889-908 (Sep. 2006).

FAQ from Pixazza's website as published on Feb. 22, 2010, retrieved at http://web.archive.org/web120100222001945/http://www.pixazza.com/faq/.

Galleguillos et al., "Object Categorization using Co-Occurrence, Location and Appearance," IEEE Conference on Computer Vision and Pattern Recognition (CVPR) Anchorage, USA (2008).

Heitz & Koller, "Learning Spatial Context: Using Stuff to Find Things," European Conference on Computer Vision (ECCV) (2008).

Hoiem et al., "Putting Objects in Perspective," IJCV (80), No. 1 (Oct. 2008).

Jain et al., "Fast Image Search for Learned Metrics," Proceedings of the IEEE Conference on Computer Vision and Pattern Recognition (CVPR) (Jun. 2008).

Lober et al., "IML: An Image Markup Language," Proceedings, American Medical Informatics Association Fall Symposium, pp. 403-407 (2001).

Rao, Leena Google Ventures-Backed Pixazza Raises $12 Million for Crowdsourced 'AdSense for Images', published Jul. 18, 2010, retrieved from http://techcrunch.com/2010/07/18google-funded-pixazza-raises-12-million-for-crowdsourced-adsense-for-images/.

Russell & Torralba, "LabelMe: a database and web-based tool for image annotation," International Journal of Computer Vision, vol. 77, Issue 1-3, pp. 157-173 (May 2008).

Torralba, "Contextual Priming for Object Detection," International Journal of Computer Vision, vol. 53, Issue 2, pp. 169-191 (2003).

Venkatesan et al., "Robust Image Hashing" Image Processing Proceedings. 2000 International Conference vol. 3, 664-666 (2000).

* cited by examiner

SYSTEM AND METHOD FOR SHARING CONTENT BASED ON POSITIONAL TAGGING

SUMMARY

Disclosed herein are systems and methods for sharing digital content based on positional tagging on a digital platform (e.g., tagging an image on a website). For example, in one embodiment, the systems and methods generally include: (a) providing a first user with an interface to tag content on a first digital platform; (b) creating a positional identifier that identifies the location of the tagged content on the first digital platform; and (c) posting, on a second digital platform, a link to the first digital platform. When a second user on the second digital platform activates the link on the second digital platform, the second user is directed to the first digital platform. The systems and methods thereafter include: (d) identifying when a second user has accessed the first digital platform via the link on the second digital platform; and (e) highlighting the tagged content on the first digital platform.

Various other alternative aspects and embodiments are further described herein. For example, in one specific embodiment, such systems and methods can be used to allow a user to tag and/or comment on an image on an original website. The user can then share the tag and/or comment on a second website (e.g., a social networking service). The shared tag and/or comment may include a link to direct secondary users, on the second website, to the original website. If the secondary users access the original website via the link on the second website, the tagged image and/or comments may be highlighted/displayed to such secondary users.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DEFINITIONS

Figure 1:
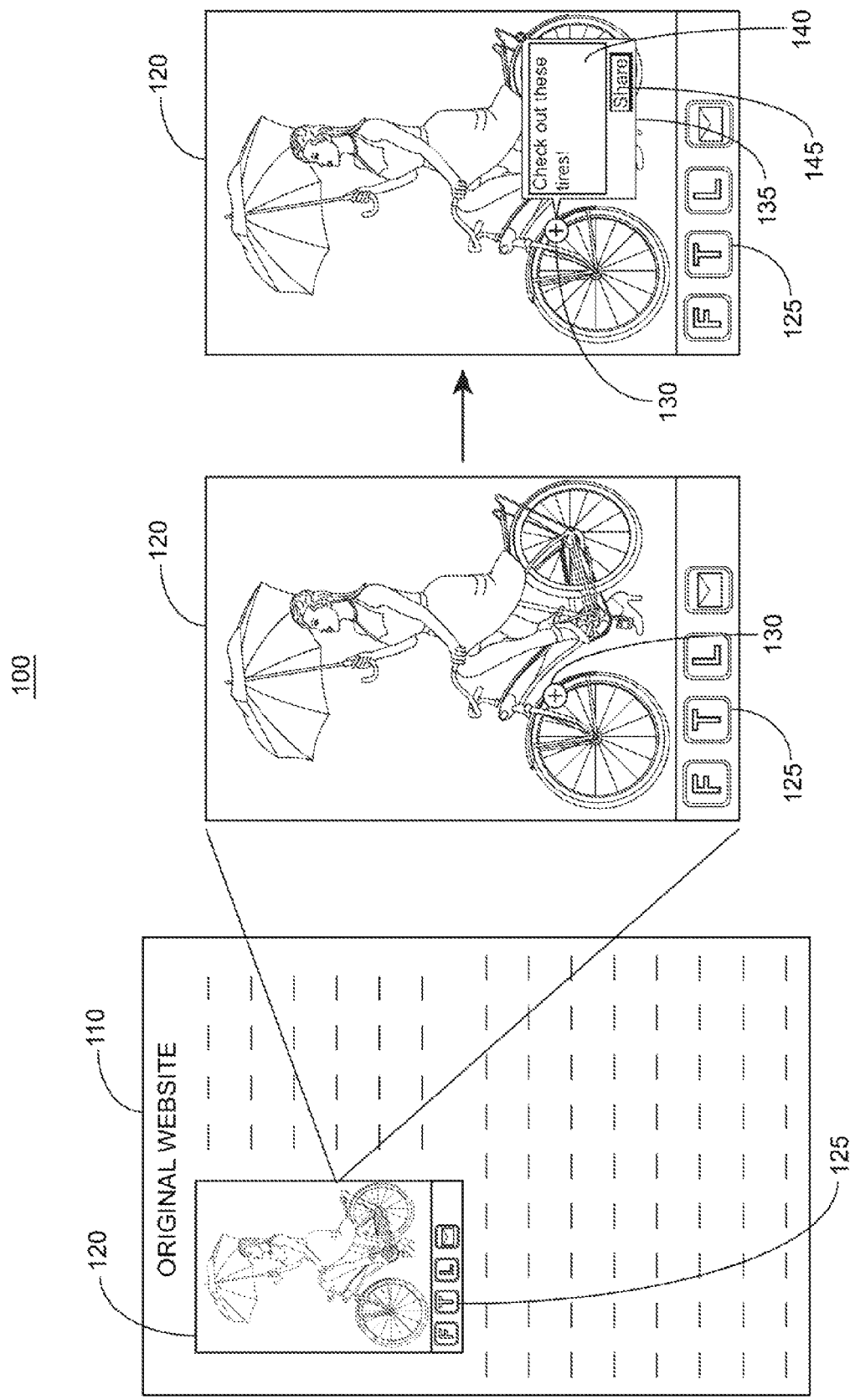
FIG. 1 is a high-level diagram illustrating an embodiment of the present invention.

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

Digital content: broadly interpreted to include, without exclusion, any content available on a digital platform, such as images, videos, text, and any combinations and equivalents thereof.

Digital platform: broadly interpreted to include, without exclusion, any websites, browser-based web applications, software applications, mobile device applications (e.g., phone or tablet applications), TV widgets, and equivalents thereof.

Image: a visual representation of an object, or scene, or person, or abstraction, in the form of a machine-readable and/or machine-storable work product (e.g., one or more computer files storing a digital image, a browser-readable or displayable image file, etc.).

Proximate: is intended to broadly mean "relatively adjacent, close, or near," as would be understood by one of skill in the art. The term "proximate" should not be narrowly construed to require an absolute position or abutment. For example, "content displayed proximate to an image," means "content displayed relatively near an image, but not necessarily abutting or within the image." (To clarify: "content displayed proximate to an image," also includes "content displayed abutting or within the image.") In another example, "content displayed proximate to an image," means "content displayed on the same screen page or web page as the image."

Before the present invention is described in greater detail, it is to be understood that this invention is not limited to particular embodiments described, and as such may vary. It is also to be understood that the terminology used herein is for the purpose of describing particular embodiments only, and is not intended to be limiting. The scope of the present invention will be limited only by the appended claims.

DETAILED DESCRIPTION

The present invention generally relates to computer-implemented content sharing systems and methods. For example, disclosed herein are systems and methods for sharing digital content based on positional tagging on a digital platform. In one embodiment, the systems and methods generally include: (a) providing a first user with an interface to tag content on a first digital platform; (b) creating a positional identifier that identifies the location of the tagged content on the first digital platform; and (c) posting, on a second digital platform, a link to the first digital platform. When a second user on the second digital platform activates the link on the second digital platform, the second user is directed to the first digital platform. The systems and methods thereafter include: (d) identifying when a second user has accessed the first digital platform via the link on the second digital platform; and (e) highlighting the tagged content on the first digital platform.

In one specific embodiment, such systems and methods can be used to allow a user to tag and/or comment on an image on an original website. The user can then share the tag and/or comment on a second website (e.g., a social networking service). The shared tag and/or comment may include a link to direct secondary users, on the second website, to the original website. If a secondary user accesses the original website via the link on the second website, the tagged image and/or comments may be highlighted/displayed to such secondary user. Various other alternative aspects and embodiments are further described below.

The following detailed description of the figures refers to the accompanying drawings that illustrate exemplary embodiments. Other embodiments are possible. Modifications may be made to the embodiments described herein without departing from the spirit and scope of the present invention. Therefore, the following detailed description is not meant to be limiting.

FIG. 1 is a high-level diagram illustrating a system and procedure 100, in accordance with one embodiment of the present invention. As shown, an image 120 is first published on an original digital platform, such as an original website 110. If a user of website 110 desires to share and/or comment on image 120, currently available systems typically require the user to: (1) copy the website's URL; (2) access a second digital platform (e.g., a second website, a social network service, an e-mail service, etc.); (3) paste the website's URL into the second digital platform; (4) and provide any comments before "posting," "sharing," and/or "sending" on the second digital platform.

The present systems and methods, however, provide an alternative means for a user to share and/or comment on content (e.g., image 120). For example, in one embodiment, system 100 provides an interface 125 proximate to image 120, wherein a user may select a second digital platform to share the content. In one embodiment, interface 125 includes icons identifying the second digital platform (e.g., an e-mail icon, a Facebook™ icon, a Twitter™ icon, a LinkedIn™ icon, etc.). After a user selects a second digital platform via interface 125, the user is provided an interface (e.g., target 130) to tag the content they desire to share. Target 130 may be used to pin-point specific content, or may be used to highlight a content area of image 120. Target 130 is also used to identify the positional location data of the tagged content on the first digital platform.

After the user tags the content they desire to share, the user is provided with an interface 135 with a submission box 140 to comment on the tagged content in image 120. Within submission box 140, the user may enter text to be shared with others. The user can then click/activate a "share" button 145 that forwards and/or posts the comment to the selected second digital platform. In an alternative embodiment, when the user tags the content with target 130, the user may be directed to the second digital platform, where the user may provide/share/post their comment directly on the second digital platform.

Figure 2:
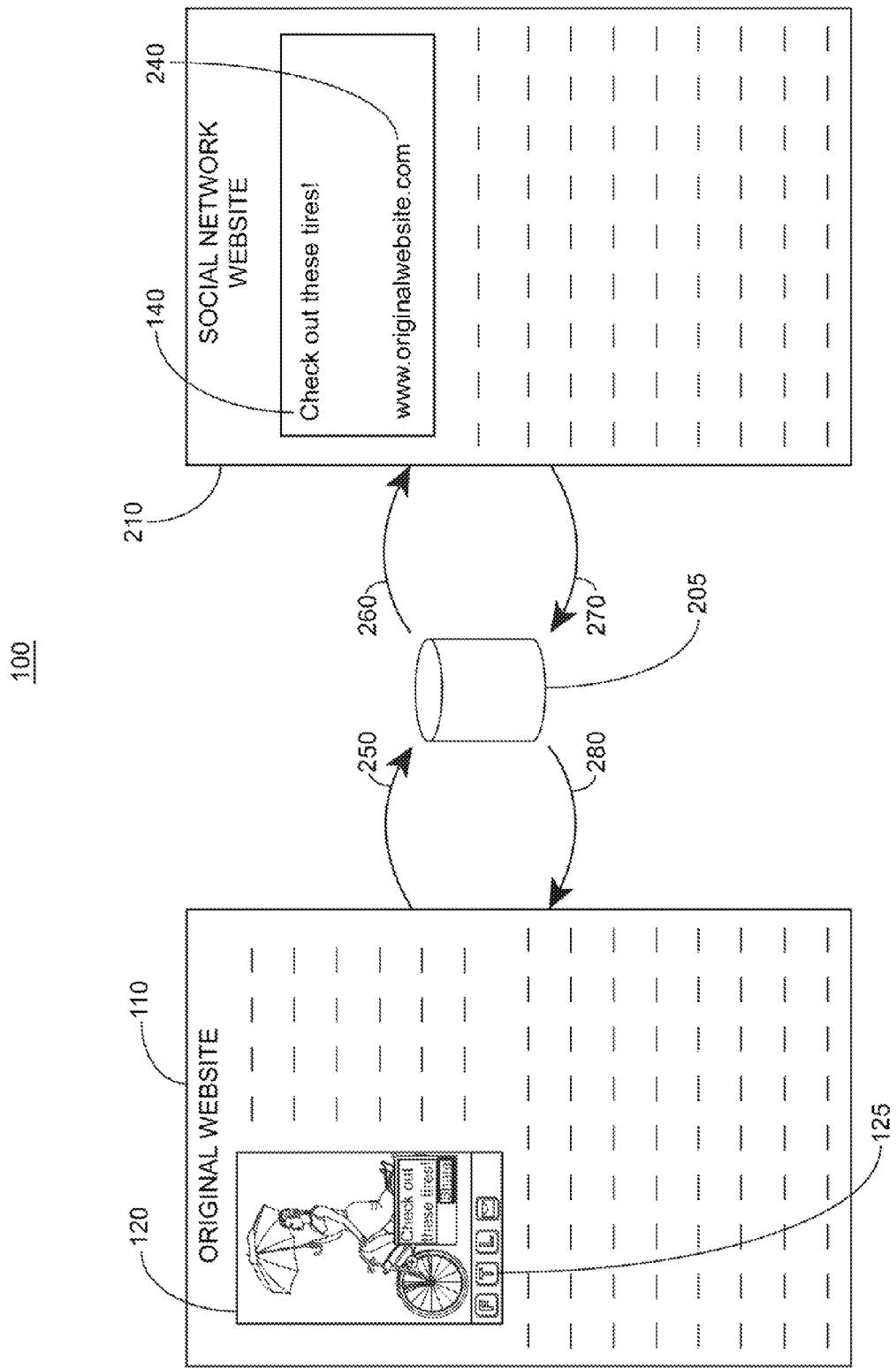
FIG. 2 is a high-level process flow diagram illustrating an embodiment of the present invention.

FIG. 2 is a high-level process flow diagram illustrating system and process 100, in further detail. System and process 100 generally allows a first user to share digital content by providing the first user with: (1) an interface 130 to tag digital content 120 on a first digital platform 110; (2) an interface 125 to select a second digital platform 210 for sharing information related to the tagged content; and (3) an interface 135 to comment on the tagged digital content. Interface 130 provides positional data of the digital content that the user has tagged. After the user has tagged the digital content, chosen a second digital platform, and/or provided a comment on the digital content, share-data 250 is submitted to a database 205. As such, in one embodiment, system and process 100 creates a database entry with share-data 250 including: (1) position data of the tagged digital content on the first digital platform, (2) identification of the first and/or second digital platform, and (3) the comment provided by the user.

Within database 205, a unique identifier (e.g., a Uniform Resource Locator (URL)) is created, which is keyed to the database entry having the share-data 250. System and process 100 then submits the unique identifier 240 and/or comment 140 (as depicted by arrow 260) to be shared (or posted, sent, or otherwise published) on second digital platform 210. In one embodiment, second digital platform 210 may be a social networking service (e.g., Facebook™, Twitter™, LinkedIn™, etc.). More generally, second digital platform 210 may be a website, a mobile application, a television application, a web-based application, and/or any equivalent or combination thereof.

Unique identifier 240 is used to direct a second user, on second digital platform 210, to the first digital platform 110. In one embodiment, the second user is directed straight to first digital platform 110. In another embodiment, the second user is redirected through database 205 (as depicted by arrow 270). In either event, the second user may be provided with an actionable cookie set (or user-cookie) that allows first digital platform 110 to identify when the second user has accessed the first digital platform via unique identifier 240. The actionable cookie set and/or unique identifier 240 may then be used to pull the share-data (as depicted by arrow 280) in the database entry of database 205.

The positional data in the share-data of the database entry is then used to highlight the tagged digital content, on the first digital platform, for the second user. For example, the share-data may be used to draw a target 130 on the tagged content, as tagged by the first user. Alternatively, the share-data may be used to draw a target 130 and dialog box (similar to interface 135) showing the comment 140 proximate to the tagged content. Shading and/or fading of un-tagged content may also be employed.

Figure 3:
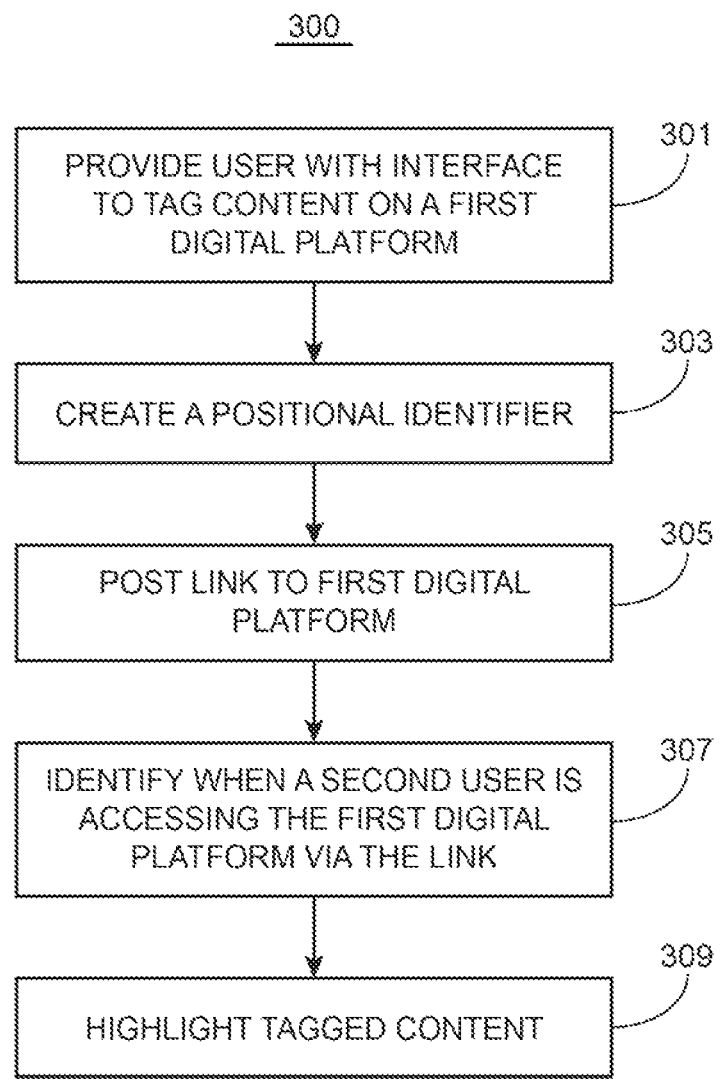
FIG. 3 is a flowchart illustrating a method in accordance with one embodiment.

FIG. 3 is a flowchart illustrating a more generalized method 300, in accordance with another embodiment, for practicing the present invention. In step 301, a user is provided with an interface to tag content on a first digital platform. For example, the user may be provided with an icon, target button, or equivalent interface, which allows the user to pin-point or highlight content. The content may be, for example, an entire image or a portion of an image. In step 303, a positional identifier is created based on the user's tagging of the digital content. The positional identifier may include coordinates indicating where the tag has been made, the size of the area highlighted, etc.

Once the position of the tagged content is identified, a link to the first digital platform can be posted on a second digital platform, as in step 305. For example, a link to the first digital platform can be posted on a social network service. In another example, a link to the first digital platform can be sent to a second user in the form of a text message, instant message, e-mail, or equivalent means. A second user, on the second digital platform, may then "click" or otherwise activate the link, in order to be directed to the first digital platform.

In step 307, the first digital platform identifies when a second user is accessing the first digital platform via the posted link. Such identification may be based on an actionable cookie set given to the second user at the second digital platform, or after activation of the link. Alternative identification means may be employed. In step 309, the tagged digital content is highlighted for the second user. For example, the "highlighting" of the tagged content may include: shading/fading surrounding areas; enhancing the size, shape, or color of the tagged content; drawing a pointer to the tagged content; publishing the first user's comment to the tagged content; and any combination or equivalent thereof.

Additional Embodiments.

In one embodiment, there is provided a method of allowing a first user to share digital content, the method comprising: (a) providing a first user with an interface to: (1) tag digital content on a first digital platform, (2) select a second digital platform for sharing information, and (3) comment on the digital content. The method further includes: (b) creating a database entry with share-data including: (1) position data of the tagged digital content on the first digital platform, (2) identification of the first digital platform, and (3) the comment of step (a)(3). The method further includes: (c) creating a unique identifier that is keyed to the database entry of step (b); and (d) submitting the unique identifier of step (c) to be published on the second digital platform of step (a)(2), wherein the unique identifier is used to direct a second user, on the second digital platform, to the first digital platform. Step (d) may further include submitting the comment of step (a)(3) to be published on the second digital platform of step (a)(2). The unique identifier of step (c) may be a Uniform Resource Locator (URL) or equivalent thereof.

When a second user is directed to the first digital platform, the method further includes: (e) identifying when the second user has accessed the first digital platform via the unique identifier of step (c); (f) using the unique identifier of step (c) to pull the share-data in the database entry of step (b); and (g) using the position data of step (b)(1) to highlight the tagged digital content, on the first digital platform, for the second user. Step (e) may include identifying a user-cookie given to the second user at the second digital platform. Step (e) may also include identifying a user-cookie given to the second user upon activation of the unique identifier of step (c). Step (g) may further include using the position data of step (b)(1) to highlight the tagged digital content by publishing the comment of step (a)(3) proximate to the tagged digital content.

The first and/or second digital platform may be selected from a group consisting of: a website, a mobile application, a television application, a web-based application, and any equivalent thereof. Further, the first and/or second digital platform may be a social networking service (e.g., Facebook™, Twitter™, LinkedIn™, etc.).

In another embodiment, there is provided a method comprising: (a) providing a first user with an interface to tag content on a first digital platform; (b) creating a positional identifier that identifies the location of the tagged content on the first digital platform; (c) posting, on a second digital platform, a link to the first digital platform; (d) identifying when a second user has accessed the first digital platform via the link on the second digital platform; and (e) highlighting the tagged content on the first digital platform. The method may further include providing the first user with an interface to comment on the tagged content. The method may further include providing the first user with an interface to select a second digital platform for sharing information. Step (c) may further comprise posting the comment on the second digital platform. Step (d) may include identifying a user-cookie given to the second user at the second digital platform. Step (d) may also include identifying a user-cookie given to the second user upon activation of the link. Step (e) may further comprise posting the comment on the first digital platform. The first and/or second digital platform may be selected from a group consisting of: a website, a mobile application, a television application, a web-based application, and any equivalent thereof. Further, the first and/or second digital platform may be a social networking service (e.g., Facebook™, Twitter™, LinkedIn™, etc.).

In yet another embodiment, there is provided a computer-based system, comprising: (a) means for allowing a first user to tag digital content on a first digital platform; (b) means for allowing the first user to comment on the tagged digital content; (c) means for allowing the first user to select a second digital platform to share the comment; (d) means for posting the comment on the second digital platform along with a means for directing a second user, on the second digital platform, to the first digital platform; (e) means for identifying when the second user has accessed the first digital platform via the means for directing the second user; and (f) means for highlighting, to the second user, the tagged digital content.

Communication Between Parties Practicing the Present Invention.

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto. The functionality and system components of an exemplary computer and network are further explained in conjunction with FIG. 4, below.

Computer Implementation.

Figure 4:
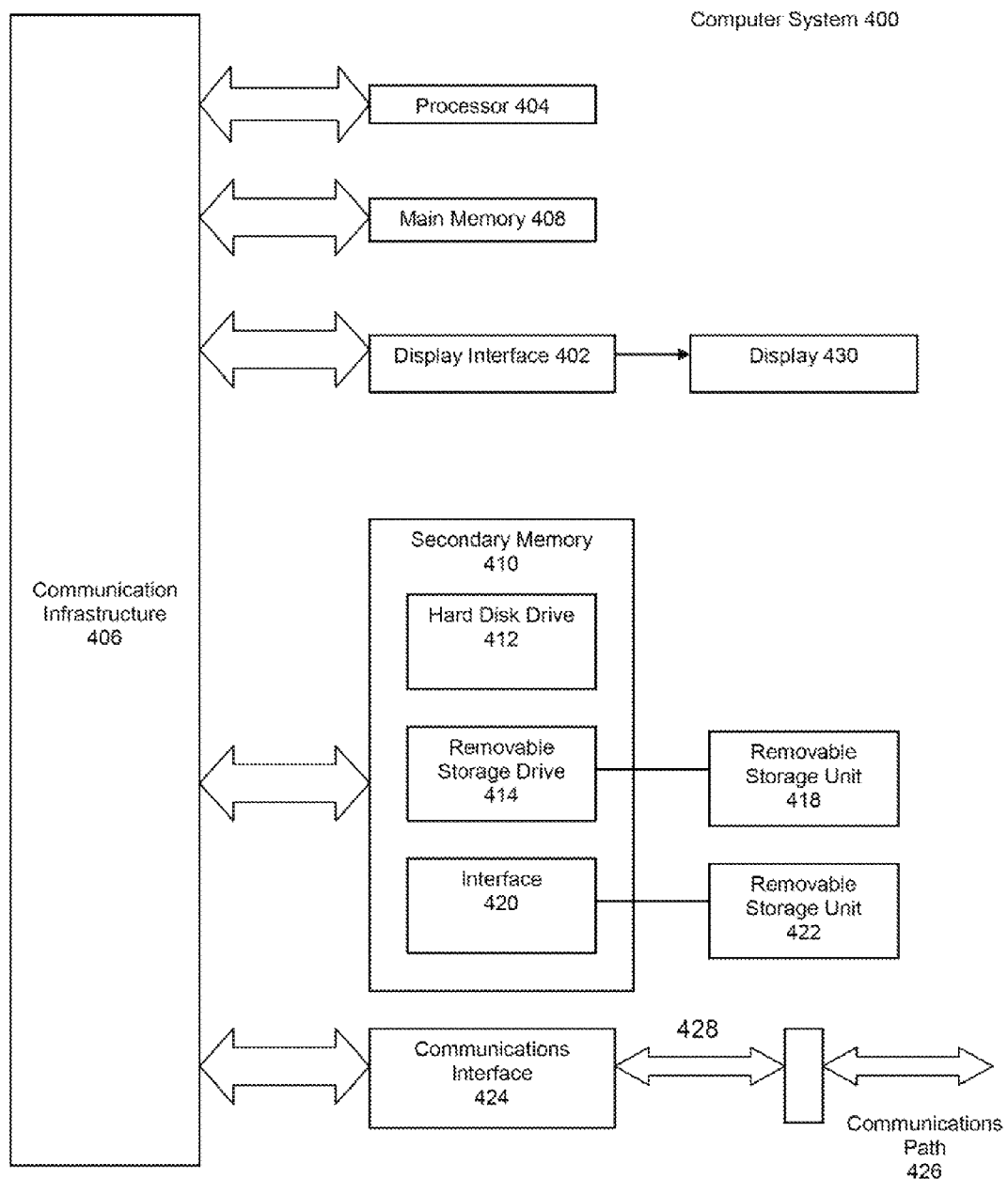
FIG. 4 is a schematic drawing of a computer system used to implement the methods.

In one embodiment, the invention is directed toward one or more computer systems capable of carrying out the functionality described herein. For example, FIG. 4 is a schematic drawing of a computer system 400 used to implement the methods presented above. Computer system 400 includes one or more processors, such as processor 404. The processor 404 is connected to a communication infrastructure 406 (e.g., a communications bus, cross-over bar, or network). Computer system 400 can include a display interface 402 that forwards graphics, text, and other data from the communication infrastructure 406 (or from a frame buffer not shown) for display on a local or remote display unit 430.

Computer system 400 also includes a main memory 408, such as random access memory (RAM), and may also include a secondary memory 410. The secondary memory 410 may include, for example, a hard disk drive 412 and/or a removable storage drive 414, representing a floppy disk drive, a magnetic tape drive, an optical disk drive, flash memory device, etc. The removable storage drive 414 reads from and/or writes to a removable storage unit 418. Removable storage unit 418 represents a floppy disk, magnetic tape, optical disk, flash memory device, etc., which is read by and written to by removable storage drive 414. As will be appreciated, the removable storage unit 418 includes a computer usable storage medium having stored therein computer software, instructions, and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow computer software, instructions, and/or data to be transferred from the removable storage unit 422 to computer system 400.

Computer system 400 may also include a communications interface 424. Communications interface 424 allows computer software, instructions, and/or data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 414, removable storage units 418, 422, data transmitted via communications interface 424, and/or a hard disk installed in hard disk drive 412. These computer program products provide computer software, instructions, and/or data to computer system 400. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the presented methods. Accordingly, such computer programs represent controllers of the computer system 400. Where appropriate, the processor 404, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 400 using removable storage drive 414, interface 420, hard drive 412, communications interface 424, or equivalents thereof. The control logic (software), when executed by the processor 404, causes the processor 404 to perform the functions and methods described herein.

In another embodiment, the methods are implemented primarily in hardware using, for example, hardware components such as application specific integrated circuits (ASICs) Implementation of the hardware state machine so as to perform the functions and methods described herein will be apparent to persons skilled in the relevant art(s). In yet another embodiment, the methods are implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium, having instructions executable by at least one processing device that, when executed, cause the processing device to: (a) provide a first user with an interface to (1) tag digital content on a first digital platform, (2) identify a second digital platform for sharing information, and (3) comment on the digital content. The instructions may also cause the processing device to (b) create a database entry with share-data including (1) position data of the tagged digital content on the first digital platform, (2) identification of the first digital platform, and (3) the comment. The instructions may also cause the processing device to (c) create a unique identifier that is keyed to the database entry; (d) submit the unique identifier to be published on the second digital platform, wherein the unique identifier is used to direct a second user, on the second digital platform, to the first digital platform; (e) identify when the second user has accessed the first digital platform via the unique identifier; (f) use the unique identifier to pull the share-data in the database entry; and (g) use the position data to highlight the tagged digital content, on the first digital platform, for the second user. The first and/or second digital platform may be selected from a group consisting of: a website, a mobile application, a television application, a web-based application, and any equivalent thereof. Further, the first and/or second digital platform may be a social networking service (e.g., Facebook™, Twitter™, LinkedIn™, etc.). The unique identifier may be a Uniform Resource Locator (URL) or equivalent thereof.

The computer-readable storage medium may further comprise instructions executable by at least one processing device that, when executed, cause the processing device to (h) submit the comment to be published on the second digital platform; (i) use the position data to highlight the tagged digital content by publishing the comment proximate to the tagged digital content on the first digital platform; (j) identify a user-cookie given to the second user at the second digital platform; and/or (k) identify a user-cookie given to the second user upon activation of the unique identifier.

In another embodiment, there is provided a computer-readable storage medium having instructions executable by at least one processing device that, when executed, cause the processing device to: (a) provide a first user with an interface to tag content on a first digital platform; (b) create a positional identifier that identifies the location of the tagged content on the first digital platform; (c) post, on a second digital platform, a link to the first digital platform; (d) identify when a second user has accessed the first digital platform via the link on the second digital platform; and (e) highlight the tagged content on the first digital platform.

Conclusion.

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A method of allowing a first user to share digital content, the method comprising:
    (a) providing a first user with an interface to:
        (1) tag digital content displayed on a first digital platform,
        (2) select a second digital platform for sharing information, and
        (3) comment on the tagged digital content;
    (b) creating a database entry with share-data including:
        (1) position data of a location where the tagged digital content is displayed on the first digital platform,
        (2) identification of the first digital platform, and
        (3) the comment of step (a)(3);
    (c) creating a unique identifier that is keyed to the database entry of step (b);
    (d) submitting the unique identifier of step (c) to be published on the second digital platform of step (a)(2), wherein the unique identifier is used to direct a second user, on the second digital platform, to the first digital platform;
    (e) identifying when the second user has accessed the first digital platform displaying the tagged content via the unique identifier of step (c);
    (f) using the unique identifier of step (c) to pull the share-data in the database entry of step (b); and
    (g) using the position data of step (b)(1) to highlight the tagged digital content, on the first digital platform, for the second user.

2. The method of claim 1, wherein step (d) further includes submitting the comment of step (a)(3) to be published on the second digital platform of step (a)(2).

3. The method of claim 1, wherein step (g) further includes using the position data of step (b)(1) to highlight the tagged digital content by publishing the comment of step (a)(3) proximate to the tagged digital content.

4. The method of claim 1, wherein the first digital platform is selected from a group consisting of: a website, a mobile application, a television application, a web-based application, and any equivalent thereof.

5. The method of claim 1, wherein the second digital platform is selected from a group consisting of: a website, a mobile application, a television application, a web-based application, and any equivalent thereof.

6. The method of claim 1, wherein the second digital platform is social networking service.

7. The method of claim 1, wherein the unique identifier of step (c) is a Uniform Resource Locator (URL).

8. The method of claim 1, wherein step (e) includes identifying a user-cookie given to the second user at the second digital platform.

9. The method of claim 1, wherein step (e) includes identifying a user-cookie given to the second user upon activation of the unique identifier of step (c).

10. A non-transitory computer-readable storage medium, comprising:
    instructions executable by at least one processing device that, when executed, cause the processing device to
    (a) provide a first user with an interface to:
        (1) tag digital content displayed on a first digital platform,
        (2) identify a second digital platform for sharing information, and
        (3) comment on the digital content;
    (b) create a database entry with share-data including:
        (1) position data of a location where the tagged digital content is displayed on the first digital platform,
        (2) identification of the first digital platform, and
        (3) the comment;
    (c) create a unique identifier that is keyed to the database entry;
    (d) submit the unique identifier to be published on the second digital platform, wherein the unique identifier is used to direct a second user, on the second digital platform, to the first digital platform;
    (e) identify when the second user has accessed the first digital platform displaying the tagged content via the unique identifier;
    (f) use the unique identifier to pull the share-data in the database entry; and
    (g) use the position data to highlight the tagged digital content, on the first digital platform, for the second user.

11. The non-transitory computer-readable storage medium of claim 10, further comprising:
    instructions executable by at least one processing device that, when executed, cause the processing device to submit the comment to be published on the second digital platform.

12. The non-transitory computer-readable storage medium of claim 10, further comprising:
    instructions executable by at least one processing device that, when executed, cause the processing device to use the position data to highlight the tagged digital content by publishing the comment proximate to the tagged digital content on the first digital platform.

13. The non-transitory computer-readable storage medium of claim 10, wherein the first digital platform is selected from a group consisting of: a website, a mobile application, a television application, a web-based application, and any equivalent thereof.

14. The non-transitory computer-readable storage medium of claim 10, wherein the second digital platform is selected from a group consisting of: a website, a mobile application, a television application, a web-based application, and any equivalent thereof.

15. The non-transitory computer-readable storage medium of claim 10, wherein the second digital platform is social networking service.

16. The non-transitory computer-readable storage medium of claim 10, wherein the unique identifier is a Uniform Resource Locator (URL).

17. The non-transitory computer-readable storage medium of claim 10, further comprising:
    instructions executable by at least one processing device that, when executed, cause the processing device to identify a user-cookie given to the second user at the second digital platform.

18. The non-transitory computer-readable storage medium of claim 10, further comprising:
    instructions executable by at least one processing device that, when executed, cause the processing device to identify a user-cookie given to the second user upon activation of the unique identifier.

* * * * *